Dec. 17, 1968  G. E. FREEBORN  3,416,193
ROTATIONAL MOLDING APPARATUS AND MOLD THEREFOR
Filed April 18, 1966  8 Sheets-Sheet 1

INVENTOR.
GEORGE E. FREEBORN
BY
Caswell, Lagaard & Wicks
ATTORNEYS

Dec. 17, 1968  G. E. FREEBORN  3,416,193
ROTATIONAL MOLDING APPARATUS AND MOLD THEREFOR
Filed April 18, 1966  8 Sheets-Sheet 3

INVENTOR.
GEORGE E. FREEBORN
BY
Caswell, Lagaard & Hicks
ATTORNEYS United States Patent Office  3,416,193
Patented Dec. 17, 1968

3,416,193
ROTATIONAL MOLDING APPARATUS AND MOLD THEREFOR
George E. Freeborn, Faribault, Minn., assignor to Faribo Manufacturing Company, Inc., Faribault, Minn.
Filed Apr. 18, 1966, Ser. No. 544,061
6 Claims. (Cl. 18—26)

ABSTRACT OF THE DISCLOSURE

A rotational molding apparatus including a base, an outer frame support, means carried by the base for rotating the outer frame support on an axis thereof, an inner frame support together with means carried by the outer frame support for rotating the inner frame support on an axis thereof, a mold adjustably mounted on the inner frame support, together with means for supplying a liquid to and from the mold for heating and cooling the same while the inner and outer frame supports are rotated.

---

The invention relates broadly to the molding of hollow plastic articles using finely divided thermo plastic particles such as polyvinyl chlorate, polyethylene, butyrate, etc., or liquid plastics such as vinyl, plastisols, nylon monomers, acrylics, etc., and more particularly to apparatus which rotates the mold on more than one axis together with the construction of the mold itself and the heating and cooling of the mold.

It is an object of the invention to provide a rotational molding apparatus having an outer frame support rotatable on its longitudinal axis and an inner frame support having means for supporting a mold adjustably positioned thereon, said inner frame support being rotatable on its transverse axis simultaneously with the rotation of the outer frame. With said rotatable frames and a mold adjustably mounted on the inner frame the center of the mold may be positioned at the intersection of the axes of the frames or may be offset from one axis or the other or both axes depending upon the configuration of the mold.

It is also an object of the invention to provide a rotational molding apparatus which will rotate a mold biaxially for the production of a hollow object having a uniform wall thickness, and which will also produce varying will thicknesses in selected areas of a given hollow article.

It is a further object to provide a rotational molding apparatus with which a mold may be simultaneously rotated and heated without the need for an oven and the restrictiveness thereof together with means for cooling the mold. As a result, the size of the article to be molded is only limited by the size of the apparatus and not limited by the size of an oven and in this connection relatively large parts may be molded such as entire truck bodies as an example.

It is an additional object to provide a mold which is heated by new and novel means. It is still a further object to provide a mold having means for heating portions thereof at different temperatures whereby wall thickness of a molded article can be controlled at various selected areas thereof.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of the application.

Figure 5:
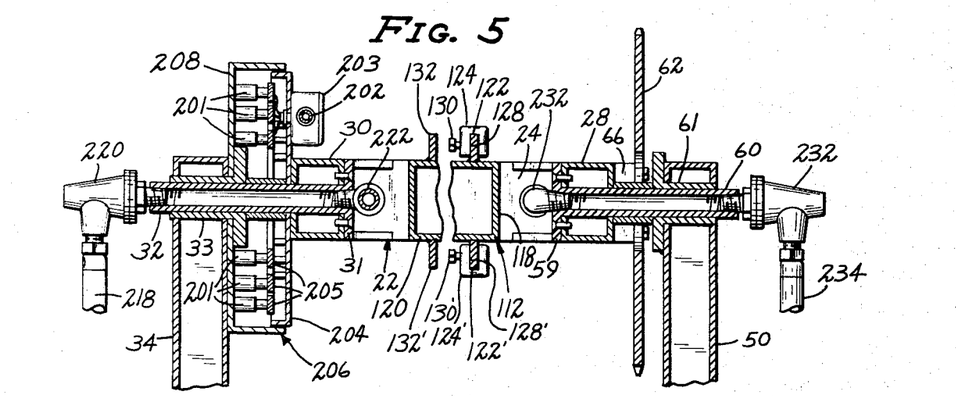
FIGURE 5 is a sectional view on the line 5—5 of FIGURE 1, portions thereof being broken away.

Referring to the drawings in detail, the apparatus A includes the main outer-support frame 22 formed of the longitudinally extending spaced side members 24 and 26 connected at the ends thereof to the inner-transverse end member 28 and the outer-transverse end member 30. The support frame 22 is rotatable on its longitudinal axis by means of a hollow shaft 32 extending through and connected to the end member 30 by means of shaft flange 31. The shaft 32 is mounted in the bearing 33, particularly FIGURE 5, secured within the upper end of the first upright support 34. The upright support 34 is secured at its lower end to the transverse end member 36 of base frame 38 and is braced by means of the braces 40 and 42 connected thereto and to the base end member 36 together with secondary braces 37 and 39.

The base frame 38 further includes the longitudinal side members 44 and 46 connected to the base end member 36 and the end member 48. A second upright support 50 is provided which is secured at its lower end to the base end member 48 and braced by means of the braces 52 and 54 connected thereto and to said base end member 48 together with secondary braces 56 and 58. Further provided for the rotation of the support frame 22 is the hollow shaft 60 extending through and connected to end member 28 by means of shaft flange 59, particularly FIGURES 1 and 5. Shaft 60 is mounted in the bearing 61 secured within the upper end of the second upright support 50. The longitudinal axis on which the support frame 22 is rotatable is indicated as x—x on FIGURE 1, which extends through the longitudinal axes of shafts 32 and 60.

The outer frame 38 is rotated by teh first drive mechanism B which includes outer support frame driven sprocket 62 which is secured to lugs 64 and 66 secured to the transverse end member 28 of support frame 22. The numeral 68 designates a drive base connected to two brackets 70 and 72, FIGURE 1, which are connected to the bracket 52 and extends outwardly therefrom. Mounted on the drive base 68 is the conventional harmonic drive reduction member 74 which has the shaft 76 extending therefrom, and on the inner end of shaft 76 is the drive sprocket 78 mounted between two slip discs 80 and 82. A link chain 79 is entrained over the sprockets 62, 78 to cause driving engagement therebetween. The slip discs 80 and 82 are adjustably torqued up on the sprocket 78 and shaft 76 by means of the torque nut 84 on the end thereof, FIGURES 1 and 2. The outer frame 22 is balanced on its rotational axis x—x by loosening the torque nut 84 thereby allowing the frame 22 to freely rotate, the balancing accomplished as hereinafter set forth.

Mounted on the outer end of shaft 76 extending from drive reduction member 74 is the variable sheave 88 which has the separable half portions 87 and 89 which are urged together by the coil spring 90. The outer end of the shaft 86 is mounted in the bearing 92 secured on the short upright support 94 connected to the outer end of the bracket 72, particularly FIGURES 1, 2 and 4. Positioned on the pulley 88 is the V-belt 96 which is also positioned on the adjustable variable sheave 98 mounted on the shaft 100 of motor 102. The split pulley 98 includes the separable half portions 97 and 99. The motor 102 is mounted on the drive base 68. Extending from the outer end of the bracket 70 is the short upright support 104 and threadedly engaged with the short support 104 is the threaded shaft 106 formed on the outer end with the knob 108. The inner end of shaft 106 is in contact axially with the end of the axial boss portion 110 of the pulley 98. The half portions 97 and 99 of pulley 98 are brought together or separated by screwing or unscrewing the threaded shaft 106, whereby the end of the shaft 106 bears against or is relieved from the boss 110 of pulley 98. Thus when the half pulley portions 97 and 99 of pulley 98 are allowed to separate the inner diameter of the puley decreases thereby allowing belt 96 to extend from the pulley 98 toward and upon pulley 88 which allows the belt to operate on a greater diameter on pulley 88, the spring 90 urging the pulley half portion 87 towards pulley half portion 89 thereby rotating shaft 86 at a lower r.p.m. Thus, by operation of the motor 102 from a source of power, not shown, the support frame 22 may be rotated on its longitudinal axis x—x at variable speeds by means of the control described.

Further provided is the inner support frame 112 which includes the longitudinally extending spaced side members 114 and 116 connected at the ends thereof to the inner transverse end member 118 and the outer transverse end member 120. The end member 118 of frame 112 has formed thereon a counterweight means to balance out the weight of a mold such as M when offset on the frame as in FIGURE 1, and the same includes an upstanding first rail member 122 secured to one side of the end member 118 and a second rail 122' secured to the other side. Slidably mounted on the rail 122 is a pair of identical weight blocks 124, each block having a slot 128 extending into the block and throughout the length of the block which receives the rail. The blocks 124 are securely positioned on the rail 122 by means of a screw 130 threadedly engaged with the block 124 and in pressure contact with the rail 122. The second rail 122' is provided with a pair of weight blocks 124' which are movably secured in the same manner as weight blocks 124. The outer end member 120 of inner frame 112 is provided with a first rail 132 on one side thereof and a second rail 132' on the other side on which blocks such as 124 and 124' may be secured to balance the mold depending on the position of the mold M.

Figures 1, 8, 15:
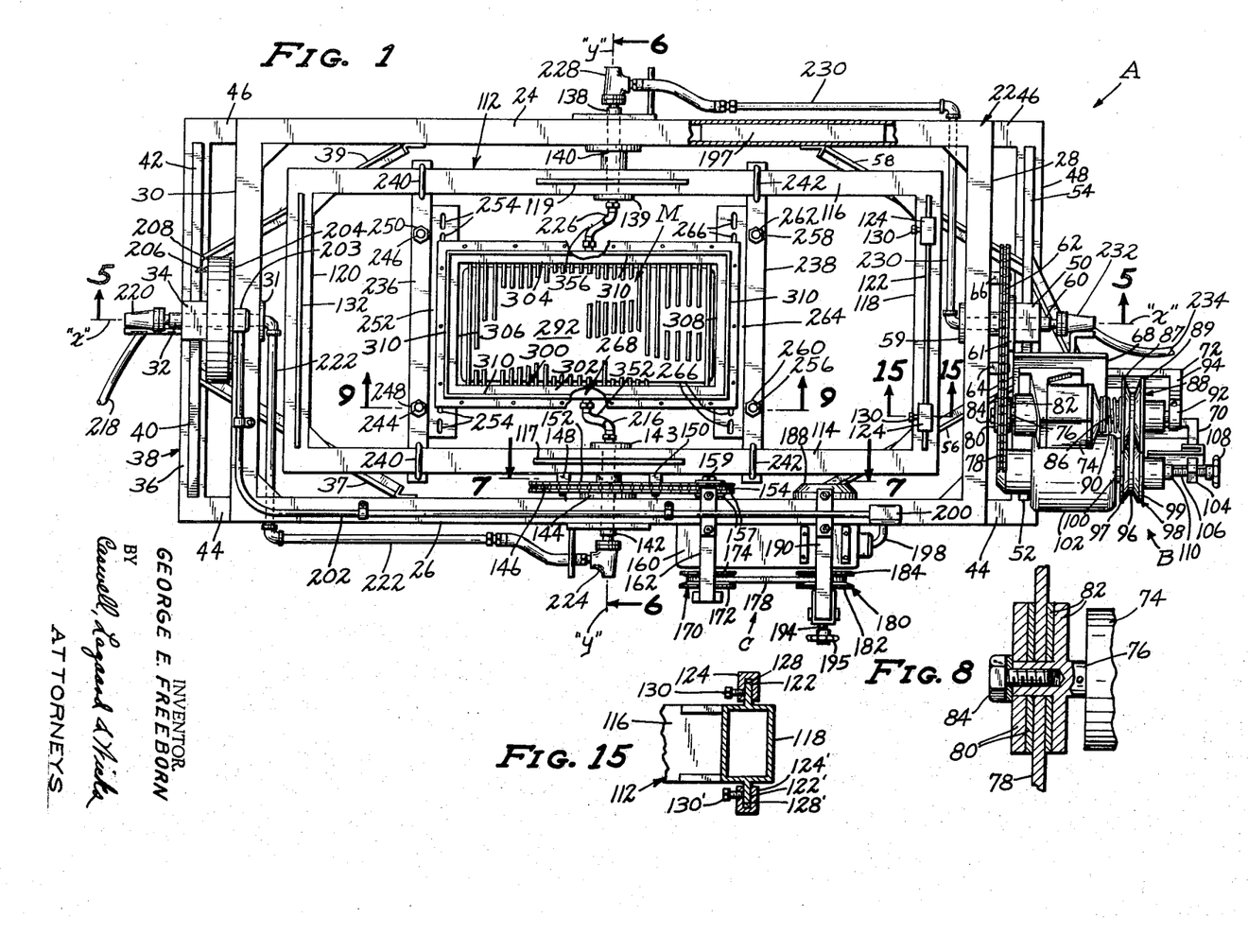
FIGURE 1 is a top plan view of the molding apparatus with a mold shown in operative position thereon but with portions of the mold support not shown.
FIGURE 8 is a sectional view on the line 8—8 of FIGURE 4.
FIGURE 15 is a sectional view on the line 15—15 of FIGURE 1.
Figures 2, 18:
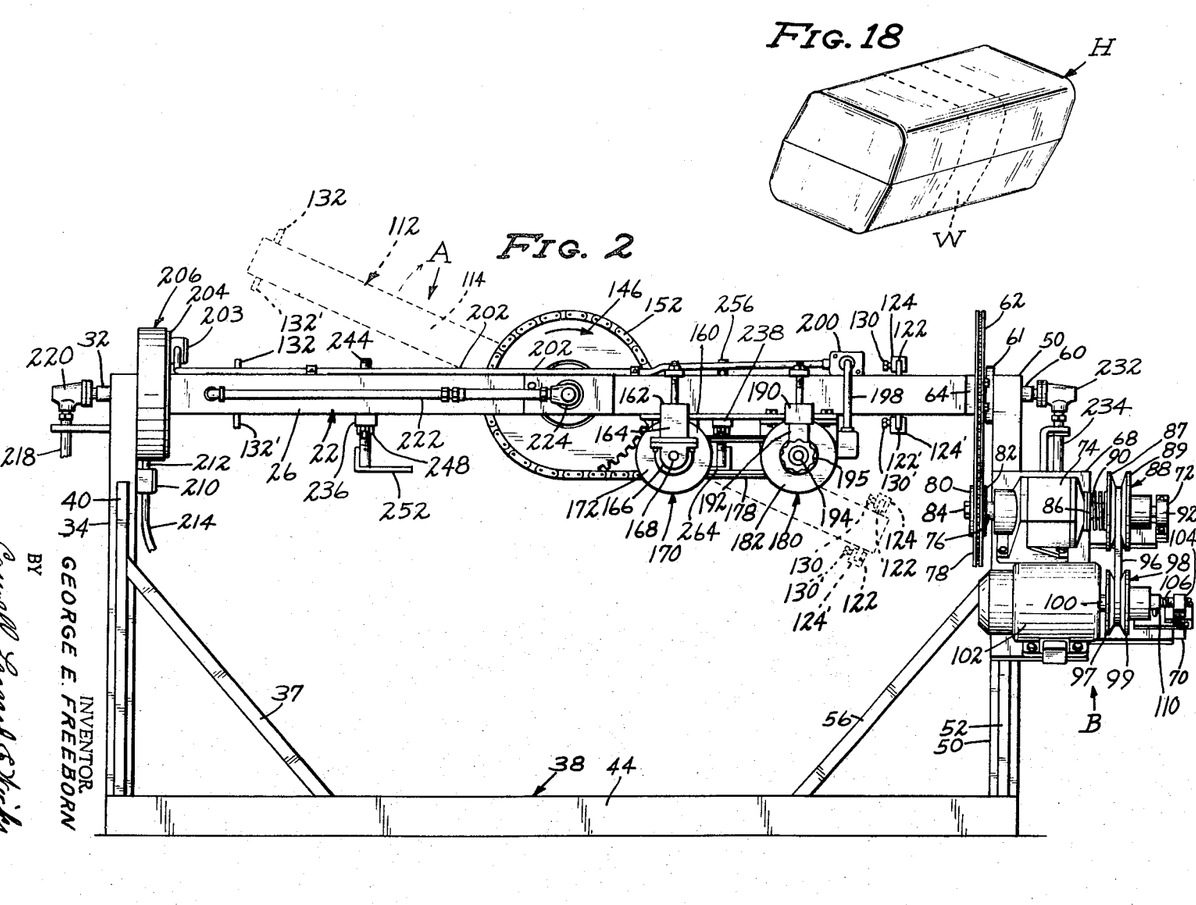
FIGURE 2 is a side elevational view of the molding apparatus with the inner frame shown in broken lines and rotated in a position out of register with the outer-frame.
FIGURE 18 is a perspective view of a hollow article produced in the mold M.
Figures 6, 7:
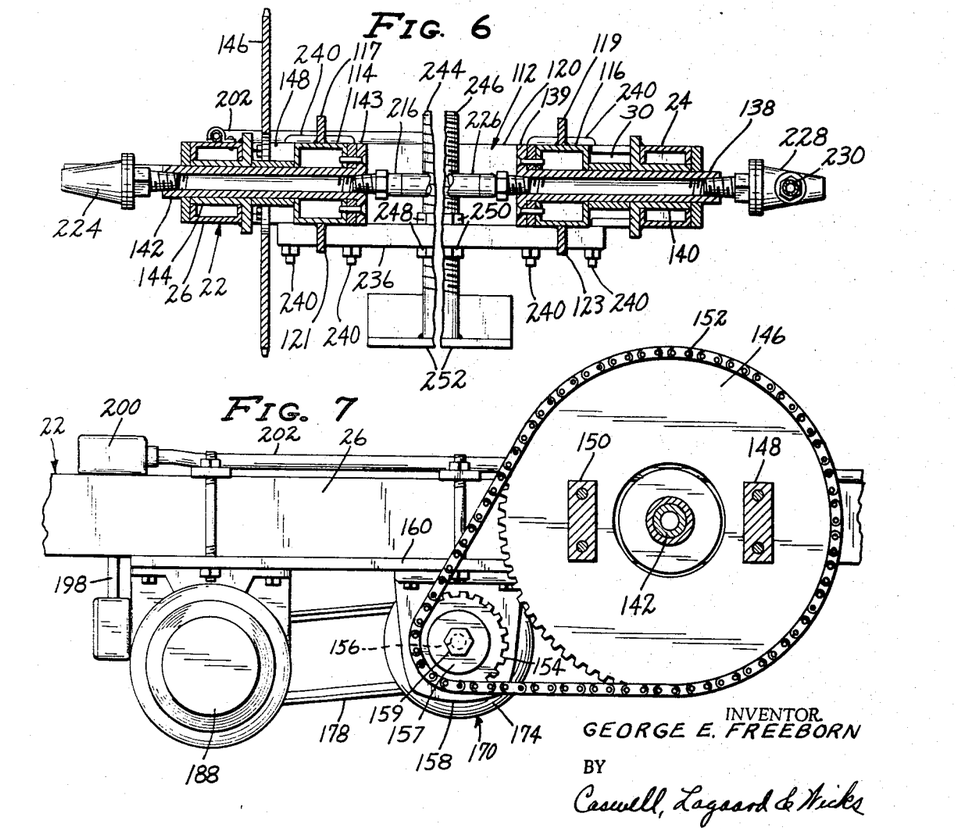
FIGURE 6 is a sectional view on the line 6—6 of FIGURE 1, portions thereof being broken away.
FIGURE 7 is a view on the line 7—7 of FIGURE 1.

The inner support frame 112 is rotatable on its transverse axis at one side, which is normal to the longitudinal axis of frame 38, by means of the hollow shaft 138 extending through the side member 24 of the frame 22 and connected to the side member 116 of the inner frame 112 by means of flange 139, the shaft 138 being journaled in the bearing 140 secured to the inner side of the side member 24, particularly FIGURES 1 and 6.

The frame 112 is rotatably mounted at the opposite side by means of the hollow shaft 142 extending through the side member 26 of frame 22 and connected to side member 114 of the inner frame 112 by means of flange 143, the shaft 142 being journaled in the bearing 144 secured to the inner side of the side member 26, particularly FIGURES 1 and 6.

The transverse axis on which the inner support frame 112 is rotatably mounted on frame 38 is indicated at "y"—"y" on FIGURE 1, which extends through the longitudinal axis of the shafts 138 and 142.

The inner support frame 112 is rotated on the outer frame by means of a second drive mechanism C which is substantially identical to that which rotates the frame 22, and the mechanism C includes the inner support frame driven sprocket 146 which is secured to lugs 148 and 150 secured to longitudinal side member 114 of frame 112, FIGURES 1 and 7 in particular. Positioned on the sprocket 146 is the drive chain 152 which is positioned on the driving sprocket 154 secured to the shaft 156 of the harmonic drive reduction member 158. The gear 154 is mounted between two slip discs 157 and secured by a torque nut 159 in the manner shown in FIGURE 8 for shaft 76. The inner frame 112 is balanced by loosening nut 159 to allow frame 112 to freely rotate, the balancing accomplished as herein set forth. The drive reduction 158 is secured to the underside of the drive plate 160 which is connected to the side member 26, FIGURES 1, 4 and 7, of the frame 22. Secured to and extending from the drive plate 160 is the transversely extending bracket 162, particularly FIGURES 3 and 4, and extending from the outer end of bracket 162 is the right-angular arm portion 164 which mounts the bearing 166. The bearing 166 mounts the outer end of the shaft 168 which in turn mounts the variable sheave 170 formed of separate half portions 172 and 174 which are urged together by the coil spring 176, particularly FIGURES 1, 2 and 4.

The numeral 178 designates a V-belt positioned on the pulley 170 and upon the adjustable variable sheave 180 including the half portions 182 and 184. The pulley 180 is mounted on the shaft 186 of the motor 188, and the motor 188 is secured to the drive plate 160.

Figure 3:
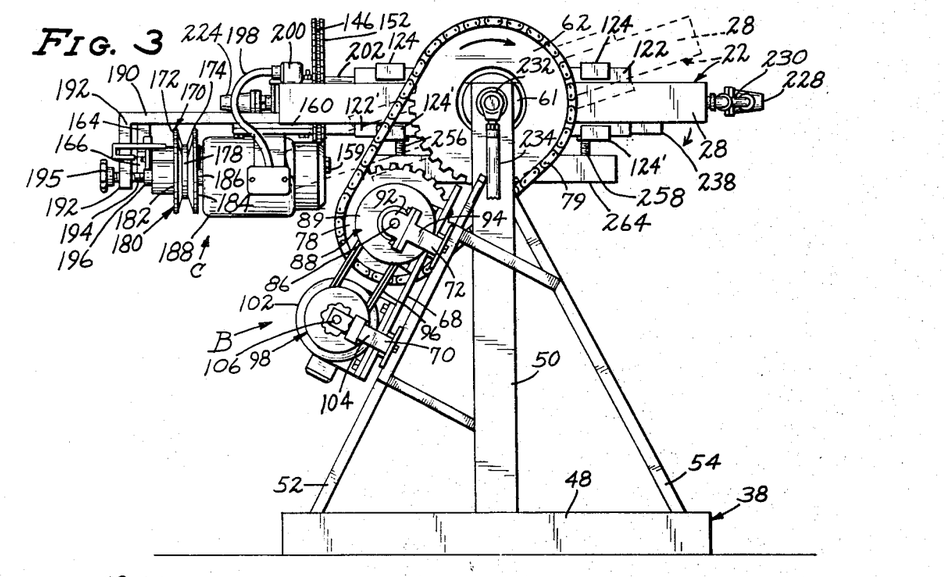
FIGURE 3 is an end view of the apparatus with the outer-frame shown in broken lines and rotated to a position other than horizontal.
Figure 4:
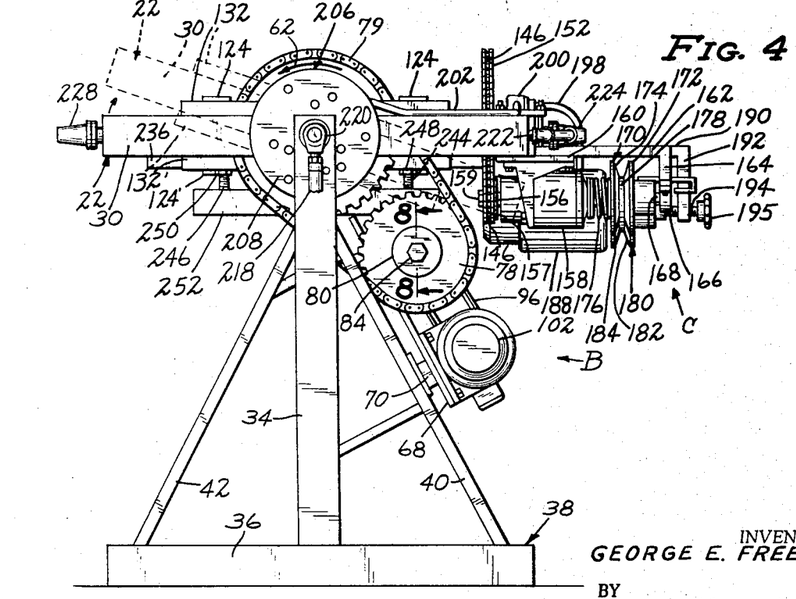
FIGURE 4 is an end view of the apparatus opposite to that shown in FIGURE 3.

Secured to the drive plate 160 and extending therefrom is the transversely extending bracket 190 and extending from the outer end of bracket 190 is the right-angular arm portion 192 which mounts the threaded shaft 194, identical to shaft 106, particularly FIGURES 1, 3 and 4. The shaft 194 is threadedly engaged with the arm portion 192, and the inner end thereof is in axial contact with the end of the axial boss 196 of the pulley 180, particularly FIGURE 3. The half portions 172 and 174 of pulley 180 are brought together or separated by screwing or unscrewing the threaded shaft 194 by means of knob 195 whereby the end of the shaft 194 bears against or is relieved from the boss 196 of pulley 180. Thus, when the half pulley portions 182 and 184 are allowed to separate, the inner diameter of the pulley 180 decreases thereby allowing belt 178 to extend from the pulley 180 toward and upon pulley 170 which allows the belt to operate on a greater diameter on pulley 180, the spring 176 urging the pulley half portion 172 toward 174 thereby rotating shaft 156 at a lower r.p.m. Thus, by operation of the motor 188 from a source of power, line 198, more fully explained hereinafter, the inner support frame 112 is rotated on its transverse axis "y"—"y" at variable speeds by means of the control described simultaneously with the rotation of the frame 22 heretofore described. To offset and balance the weight of the second drive mechanism C, weight 197 is secured within the side member 24.

Electric power to the motor 188 is supplied by means of the line 198 coupled to the outlet box 200 mounted on the side frame member 26. A conduit line 202 is mounted on the side frame member 26 and leads to the junction box 203 mounted on the inner housing portion 204 of the split ring assembly 206. The housing portion 204 is secured to the end frame member and rotates therewith. The split ring assembly 206 also includes the outer housing portion 208 which is secured to the top end of the support 34. Inside the assembly 206 are conventional brushes 201 which make contact with the concentric rings 205 whereby current is carried from junction box 210 through line 212 to split ring assembly 206, which is connected to box 203 connected to lines 200 and 198 for the operation of motor 188. A source of current, not shown, is connected to line 214 which is connected to box 210.

A heating and cooling liquid for the mold M is supplied to the tube connection 216 for the mold M by means of the supply line 218 connected to the conventional rotary union 220 which is connected to the hollow shaft 32. The hollow shaft 32 is connected to the line 222 mounted on the frame 22, and the line 222 is connected to the conventional rotary union 224 mounted on the hollow shaft 142 connected to the tube connection 216, particularly FIGURES 1 and 6.

Figure 16:
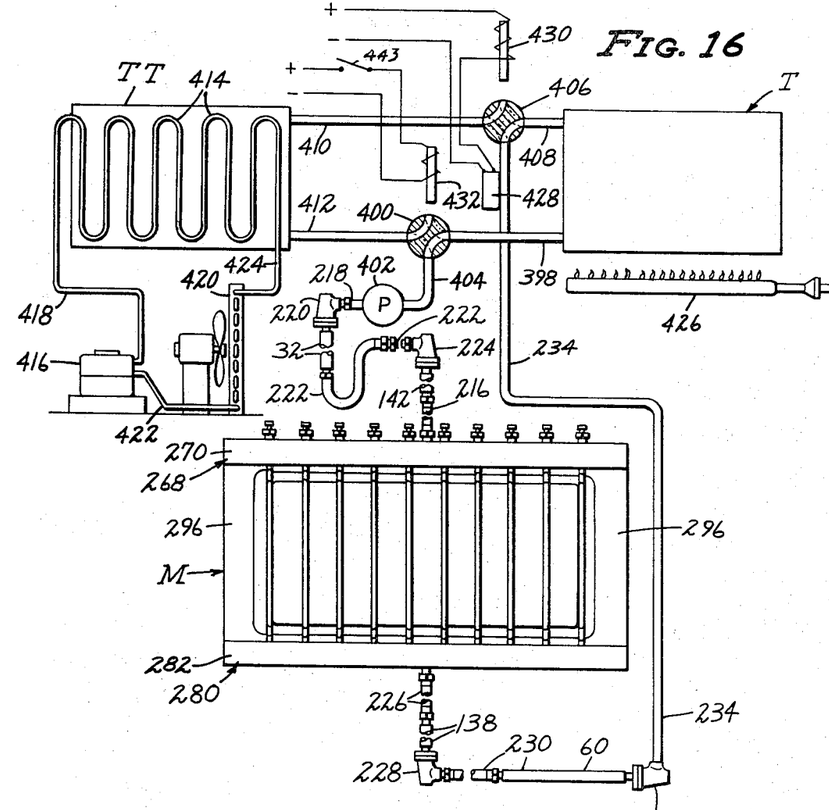
FIGURE 16 is a diagrammatic view of the hot and cold liquid supply tanks, valves, lines and heat sensors therefor.

The numeral 226 designates a return tube connection which is connected to the hollow shaft 138 which is connected to the conventional rotary union 228 connected to the line 230 mounted on the frame 22 and connected to the hollow shaft 60 which in turn is connected to the rotary union 232. Connected to the union 232 is the return line 234. The inlet supply line 218 and outlet line 234 are shown in FIGURES 1 and 16, FIGURE 16 being a diagrammatic layout of the hot and cold supply tanks, lines and the valves and heat sensor units. Thus, a hot liquid, such as oil, can be passed through the mold to cool the same, all while the mold is rotating on both axes.

Figure 9:
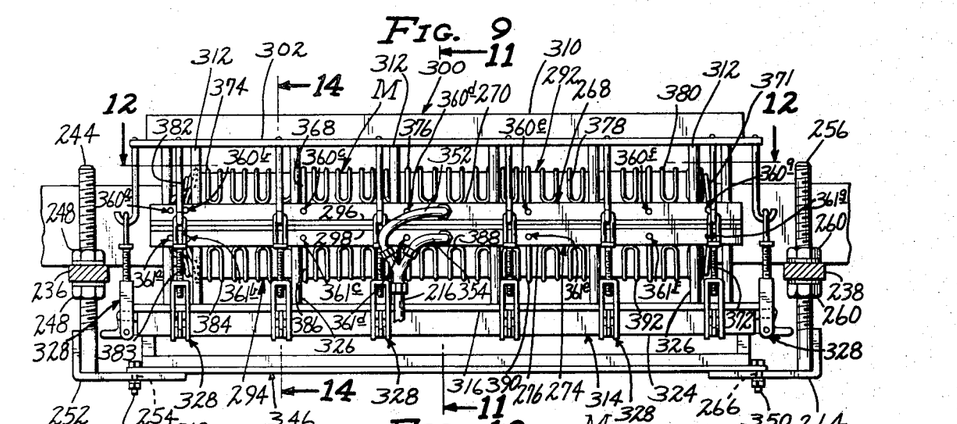
FIGURE 9 is a sectional view on the line 9—9 of FIGURE 1 showing the mold in particular.

The mold M is adjustably positioned on the inner support frame 112 by means which includes the transverse spaced support bars 236 and 238 adjustably secured to the frame side members 114 and 116 by means of the U-bolts 240 and 242, respectively, particularly FIGURES 1 and 9. When it is desired to distribute molding material to a specific portion of the mold, the mold M may be, for example, offset from the axis y—y of frame 112 as in FIGURE 1. The mold M may also be offset from the axis x—x depending upon other requirements of molding material distribution. Mounted on the support bar 236 are the spaced threaded rods 244 and 246 which extend in each case through a hole in the bar and each is adjustably secured to the bar by a pair of nuts 248 and 250 on opposite sides of the bar. The numeral 252 designates a transverse angle support which is welded to the lower ends of the rods 244 and 246. The support 252 has formed therein a multiplicity of slots 254 to provide for transverse adjustment of the mold M relative to the support frame 112 as will be hereinafter set forth.

Mounted on the support bar 238 are the spaced threaded rods 256 and 258 which extend in each case through a hole in the bar and each is adjustably secured to the bar by a pair of nuts 260 and 262 on opposite sides of the bar. The numeral 264 designates a transverse angle support which is welded to the lower ends of the rods 256 and 258. The support 264 has formed therein a multiplicity of slots 266 to provide for transverse adjustment of the mold M relative to the support frame 112 in cooperation with the support 252 as will be hereinafter set forth. The threaded rods 244 and 246 together with 256 and 258 allow adjustment of the mold M in a plane normal to a plane common to the longitudinal axes of said frame side members 114 and 116. It will be noted in FIGURE 9 that the mold M is centrally of a plane normal to a plane common to the side members 114 and 116. When the mold is mounted to one side or the other of a plane common to the members 114 and 116, then the same must be balanced by means of weights such as 124″ adjustably mounted on rails 117 and 119 or rails 121 and 123, FIGURES 1 and 6 particularly. Rails 117 and 121 are secured to member 114, and rails 119 and 123 are secured to member 116.

The mold M and support therefor includes the upper inlet manifold 268 formed of the elongated member 270 formed with the internal passageway 272. Further included is the lower inlet manifold 274 formed of the elongated member 276 which is substantially identical to upper inlet manifold 268 and which is formed with internal passageway 278, particularly FIGURES 11, 13 and 14.

The numeral 280 designates the upper outlet monifold formed of the elongated member 282 formed with the internal passageway 284. Also included is the lower outlet manifold 286 formed of the elongated member 288 which is substantially identical to the upper outlet manifold 280 and which is formed with internal passageway 290, particularly FIGURES 11, 13 and 14. As will be seen the upper inlet manifold 268 overlies the lower inlet manifold 274, and the upper outlet manifold 280 overlies the lower outlet manifold 286 all in the manner hereinafter set forth.

The mold M includes the identical upper and lower half portions 292 and 294, respectively. The upper mold portion 292 includes the peripheral flange portion 296, and the lower mold portion 294 includes the peripheral flange portion 298. The mold flanges 296 and 298 at the longitudinal sides of the mold are positioned between the upper and lower inlet and outlet manifolds 268 and 274 and 280 and 286, respectively.

Further provided is the upper rectangular mold frame support 300 which includes the side members 302 and 304 connected at the ends thereof by the end members 306 and 308. The side members 302 and 304 and the end members 306 and 308 are each formed with the upstanding rib portion 310. Secured to and depending from the underside of the upper frame side and end members are the upper pressure rods 312 which contact and bear upon the upper surface of the upper inlet and outlet manifold portions 270 and 282 and the mold end flange portions 296 and 298.

Figures 13, 14:
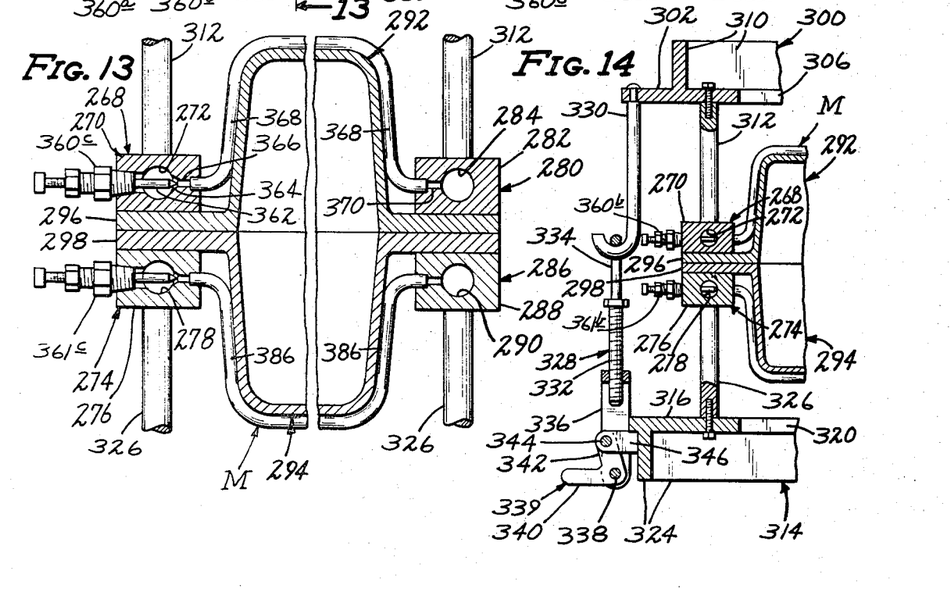
FIGURE 13 is a sectional view on the line 13—13 of FIGURE 12, portions thereof being broken away.
FIGURE 14 is a partial sectional view on the line 14—14 of FIGURE 9, showing in particular the clamping means for the mold.
Figure 17:
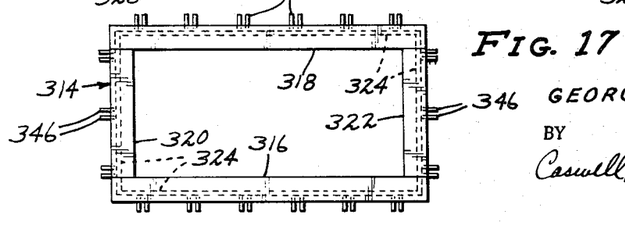
FIGURE 17 is a top plan view of the lower rectangular mold frame removed from the apparatus.

The numeral 314 designates the lower rectangular mold frame support which includes the horizontal side members 316 and 318 connected at the ends thereof by the horizontal end members 320 and 322, particularly FIGURES 9, 14 and 17. The side and end members of the mold frame support 314 each includes the depending flange portion 324. Secured to and extending upwardly from the side members 316 and 318 and the end members 320 and 322 are the lower pressure rods 326 which contact and bear upon the under surface of the lower inlet and outlet manifold portions 274 and 286.

The half portions 292 and 294 of mold M are held together in sealing engagement through the frames 300 and 314 by means of a multiplicity of clamps 328 mounted on and connecting the frames 300 and 314. The clamps 328 are identical whereby only one thereof is described in detail, particularly FIGURE 14. Each of the clamps 328 includes the upper hook portion 330 connected to the upper mold frame support and the lower threaded rod portion 332 formed with the inverted U-shaped upper portion 334 engaging the hook 330. The lower end of the threaded rod portion 332 is threadedly engaged with the shackle portion 336.

The lower free ends of the clamp shackle portion 336 are joined by the pin 338, and pivotally mounted on the pin 338 is the cam member 339 formed of the lower leg portion 340 and the upper leg portion 342. The upper leg portion 342 of cam 339 is pivotally connected to pin 344 mounted between a pair of spaced ears 346 secured to and extending outwardly from the frame 314 and between the side portions of shackle portion 336. The pin 344 is offset from pin 338 whereby pin 344 is over dead center when the leg 340 is placed in this position shown in FIGURE 14 thus effecting a clamping action for the mold frames 300 and 314. The clamps 328 are released by raising the leg portion 340 upwardly thereby pivoting the pin 338 upwardly to effect a release of the clamp 328.

The lower mold frame 314 is secured to the base support frame 346 which in turn is adjustably secured at one end to the transverse angle support 252 by means of the nut-equipped bolts 348 extended therethrough and secured through the slots 254 of support 252. The other end of the frame 346 is adjustably secured to the transverse angle support 264 by means of the nut-equipped bolts 350 extended therethrough and secured through the slots 266 of support 264.

The liquid inlet line 216, FIGURE 1 is connected to the short upper inlet line 352 which in turn is connected to the upper inlet manifold 268, and is also connected to the inlet line 216 is the short inlet line 354 which in turn is connected to the lower inlet manifold 274, particularly FIGURES 1, 9, 10 and 11.

Figure 10:
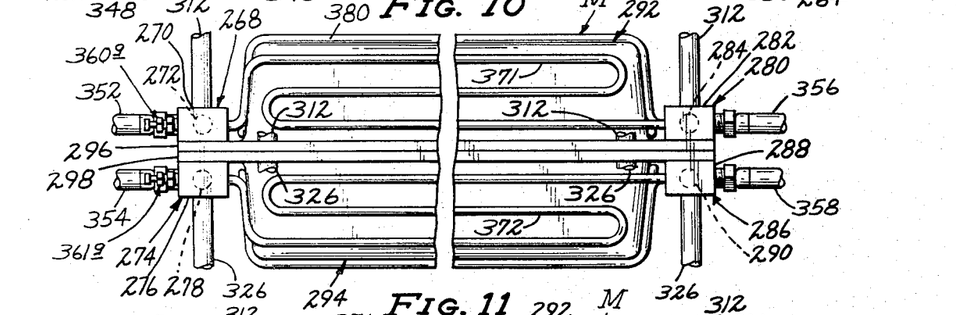
FIGURE 10 is an end view of the mold in position on the apparatus taken at the right of FIGURE 9, a portion of which is broken away.
Figure 11:
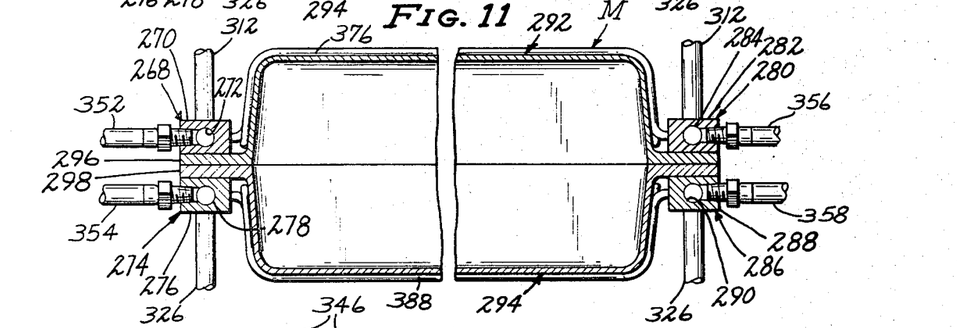
FIGURE 11 is a sectional view on the line 11—11 of FIGURE 9.
Figure 12:
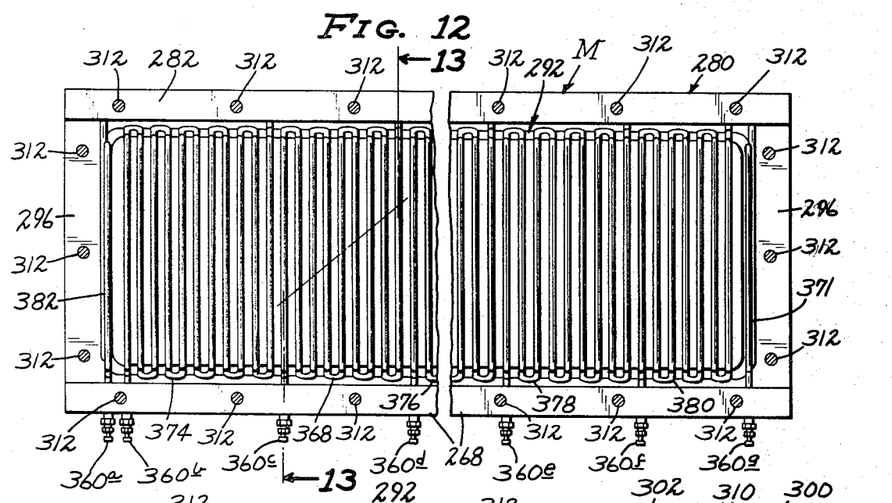
FIGURE 12 is a view substantially on the line 12—12 of FIGURE 9 showing particularly the top of the mold.

The liquid outlet line 226, FIGURE 1 is connected to the short upper outlet line 356 which is connected to the upper outlet manifold 280, and also connected to the outlet line 226 is the short outlet line 358 which in turn is connected to the lower outlet manifold 286, particularly FIGURES 1, 10 and 11.

Mounted on the upper inlet manifold 268 are a multiplicity of needle valves 360a and through 360g for the control of flow of liquid from the passageway 272 of the manifold to the tubes secured to and extending over and upon the mold as hereinafter described.

As illustrative of the mounting and connection of a needle valve to a manifold attention is directed to needle valve 360c, FIGURES 1 and 13 in particular, wherein the needle 362 cooperates with the seat 364 of manifold 268. Connected to outlet 366 of manifold 268 is tube 368 which extends upon the side of the mold M and up to and upon the top in zig-zag fashion across the top and down the opposite side to upper outlet manifold 282 where it is connected to inlet 370 which communicates with passageway 284. Thus, the section of tubing 368 when filled with liquid effects the mold half 292 at and adjacent the area covered thereby which is true of the other mold tubing sections herein described.

The upper end of the mold half 292, looking to the left from the right of FIGURE 9, is heated and cooled by the tubing 371 connected at one end to the inlet manifold 268 and opened and closed by means of end needle valve 360g in the same manner as needle valve 360c. The tubing 371 extends back and forth over and upon the end of the upper mold half 292 to upper outlet manifold 280 and connects with passageway 284 thereof. The lower mold end of half 294 is heated and cooled by the tubing 372 thereon, the needle valve 361g in the same manner as tubing 370 and valve 360g, tubing 372 being connected to passageway 290 of outlet manifold 286.

Needle valve 360b of upper inlet manifold 268 controls the flow of liquid to tubing section 374 secured upon the mold half 292 in the same manner as valve 360c hereinbefore described thereby heating and cooling the mold half 292 covered by the section of tubing 374. Identical and additional control together with heating and cooling of mold half 292 is done by valves 360d with tubing 376, valve 360e with tubing 378, valve 360f with tubing 380 and end valve 360a with tubing 382 for the end of the mold half 292 at the left of FIGURE 9, as in the case of valve 360g for the opposite end of the mold as described.

The half mold portion 294 is heated and cooled by liquid in the same manner as the mold half portion 292 by means of end valve 361a with tubing 383, and valve 361b with tubing 384, valve 361c with tubing 386, valve 361d with tubing 388, valve 361e with tubing 390, valve 361f with tubing 392, together with end valve 361g as previously described.

Thus, it will be seen that by means of the various needle valves and tubing sections described the entire mold may be heated and cooled uniformly or selected areas of the mold may be heated and cooled to a greater or lesser degree than other areas. If a thickened small area such as W is required as shown in the hollow article H, FIGURE 18, produced in the mold M, the valve 360d would be opened to a greater degree than the other valves whereby greater heating of the mold would be effected by the greater volume of flow of heated liquid to the tubing section 376. Other areas of the finished molded article may be similarly thickened by use of the valves described while the mold M is rotated.

A hot liquid such as oil for heating the mold M is maintained in supply in the supply tank T, FIGURE 16, and leading from tank T is the supply line 398. The line 398 is connected to the two-way valve 400 and leading from the valve 400 on one side to the pump 402 is the line 404. Leading from the pump 402 is the line 218, FIGURES 16 and 1, which is connected to the rotary union 220 heretofore described. The line 222 connects the rotary union 220 to rotary union 224 which is connected to connection 216 which connects with upper and lower inlet manifolds 268 and 274 as heretofore described. Return tube 226 leads from both upper and lower outlet manifolds 280 and 286 respectively, to rotary union 228 via line 230 to rotary union 232 to which is connected to return line 234, FIGURES 16 and 1. Line 234 is connected to two-way valve 406 which is connected on one side to tank line 408 leading into tank T. The other side of valve 406 is connected to line 410 which leads to cooling tank TT. Leading from tank TT is return line 412 which is connected to the other side of valve 400.

Tank TT is cooled by means of the coils 414 therein which are cooled by connection with the pump 416 by means of line 418, the pump 416 being connected to radiator 420 by line 422. Radiator 420 is connected to coils 414 by line 424. Heating means such as the gas burner 426 is used to heat the supply tank T.

Further provided is the conventional heat sensor 428 mounted on line 234 and which is wired to the solenoid 430.

With the apparatus described, hot oil is supplied to the mold M through the operation of pump 402, valve 400 and lines 398, 218, 222, and 216 and returned to the tank T via lines 226, 230, and 234 and valve 406.

When the mold M has been sufficiently heated and the heat cycle is over, the mold is cooled by changing the valve 400 from the spring loaded normally hot flow full line position of FIGURE 16 so as to connect lines 412 and 404 thereby allowing cool oil from tank TT to be pumped to the mold, while hot oil is still being directed to tank T by valve 406. The valve 400 is moved from the normal hot flow full line position of FIGURE 16 to allow cool oil from line 412 to enter line 404 by means of solenoid 432. The solenoid 432 is in the "off" position when heating the mold and in the "on" position when cooling the mold. When the oil passing through the line 234 at the point of the sensor 428 reaches a predetermined reduced temperature, sufficient to be handled by tank TT, the valve 406 is actuated to connect line 234 and line 410 thereby directing the oil to the cooling tank TT. The sensor 428 actuates the solenoid 430 which actuates valve 406 heretofore mentioned, thereby directing oil from line 234 to line 410 for cooling. The solenoid 430 and the sensor 428 are electrically connected in series. Thus by actuating solenoid 432 cool oil eventually reaches the sensor 428 thereby automatically actuating the valve 406 by means of solenoid 430 as stated. A switch 433 is provided to operate the solenoid 432.

In preparing the device A for operation, the inner frame support 112 is balanced prior to the balancing of outer frame support 22 by loosening the torque nut 159, FIGURE 7, thus loosening gear 154 between plates 157 whereby the frame support 112 may be freely rotated. The mold supports 236 and 238 may be adjusted and the weights 124 placed so as to balance the mold depending upon its size, configuration and location on support 112. Balancing of frame 112 is further accomplished by using the adjustable threaded rods 244 and 246, 256 and 258 depending again on the position of the mold M. The nut 159 is then tightened.

With the frame support 112 balanced, the outer frame support is balanced by loosening the torque nut 84 and using the nuts 348 and 350 in slots 254 and 266 whereby the mold M may be adjusted depending upon its size and configuration. With both frames 22 and 112 balanced with the mold M thereon, the nut 84 is tightened.

It will be seen that with the structure disclosed that the center of a mold may be placed on the intersection of the axes or rotation of frames 112 and 22 for even distribution of molding material within a mold, if desired, and particularly where the mold is spherical.

Figure 19:
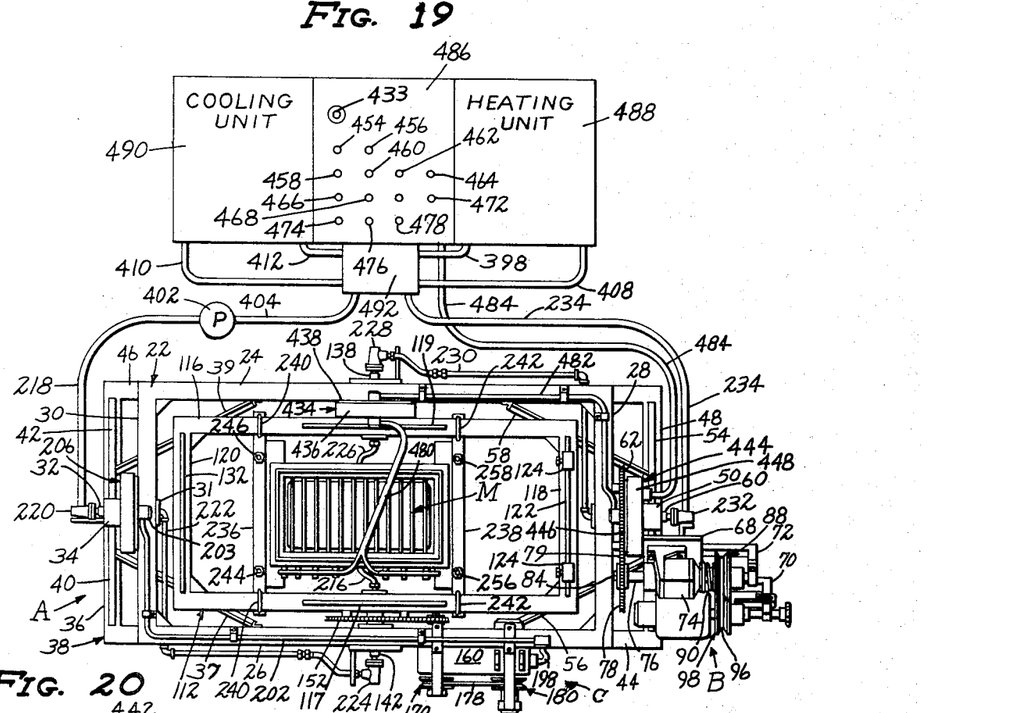
FIGURE 19 is a top plan view of the molding apparatus as shown in FIGURE 1 but modified with mechanism for supplying electrical power to the inner support frame and actuating the needle valves supplying the mold (not shown in detail) with a liquid for heating and cooling of the mold.
Figure 20:
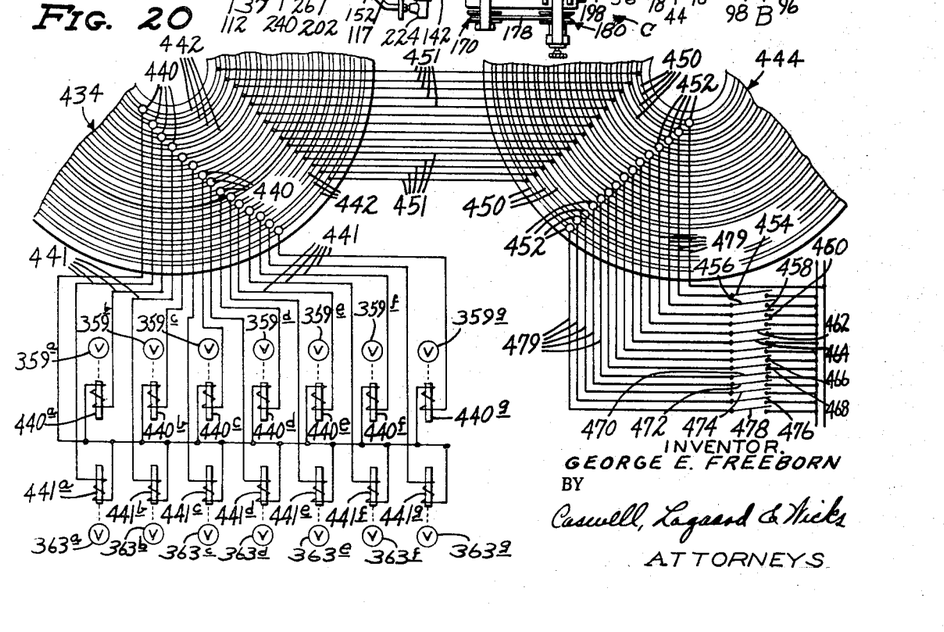
FIGURE 20 is a diagram of the slip disc ring assemblies and solenoid actuated needle valves.

In FIGURE 19 is found a molding apparatus as shown in FIGURE 1 but modified with mechanism for supplying electrical power to the inner support frame and actuating the needle valves 359a through 359g and 363a through 363g which supply the mold M with a liquid medium for heating and cooling the mold, FIGURE 20. Mounted between the side member 116 of the inner frame 112 and the side member 24 of the outer frame 22 is the slip ring asembly 434 of the type found in the slip ring asembly 206. The assembly 434 includes the outer housing portion 436 which is secured to the side member 116 of frame 112 and the inner housing 438 which is secured to the side member 24 of frame 22. Mounted within the housing portion 436 is a multiplicity of contact brushes 440, FIGURES 19 and 20, and mounted within the housing portion 438 is a multiplicity of concentric contact rings 442 for coaction with the brushes 440.

Figure 21:
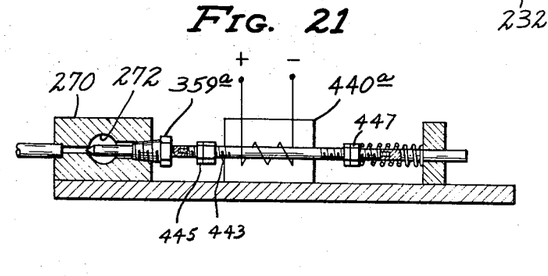
FIGURE 21 is a diagrammatic illustration representative of the solenoid actuated valves used in the embodiment of FIGURES 19 and 20.

The brushes 440 are electrically connected to the solenoids 440a through 440g by means of the lines 441 which actuate the values 359a through 359g and the brushes 440 are wired to the solenoids 441a through 441g which actuate the valves 363a through 363g as illustrated in FIGURE 20. The valves 359a through 359g and valves 363a through 363g together with the solenoids 440a through 440g and 363a through 363g in connection therewith are representatively shown in FIGURE 21 and are used on the mold M in place of the valves 363a through 360g and valves 361a through 361g. With reference to FIGURE 21, the representative valve 359a is mounted on the rod 443 equipped with the stop nut 445 adjustable thereon to control the amount of opening of the valve when the solenoid 440a is actuated. A further stop nut 447 is adjustable positioned on the rod 443 to increase or decrease the amount of spring pressure holding the valve 359a in closed position.

Further provided is the slip ring assembly 444 which includes the inner housing portion 446 which is secured to the gear 62, the gear 62 secured to the frame end member 28 of frame 22, and the outer housing 448 which is secured to the upper end of the vertical support 50. Mounted within the inner housing 446 is a multiplicity of concentric rings 450, FIGURES 19 and 20, and mounted within the outer housing portion 448 is a multiplicity of brushes 452 for coaction with the rings 450. The rings 442 of assembly 434 are electrically connected to rings 450 of assembly 444 by lines 451, and the brushes 452 are connected to the switches 454–478 by lines 479. Thus, by closing switch 454 solenoid 441a is operated thereby actuating valve 363a, the other solenoids and valves associated therewith being operated in a similar manner. With the valve 363a opened for a longer period than the other valves for example, a greater amount of material will be melted in the mold in the area of tubing fed by valve 363a.

The innermost ring 440 of assembly 434 is the ground ring common to all solenoids 440a through 440g and 441a through 441g and the innermost ring 450 of assembly 444 is the ground ring also common to all of the aforementioned solenoids.

The lines 441 are enclosed in the circuit 480, and the lines 451 are enclosed in the conduit 482. The lines 479 are enclosed in the conduit 484 and are connected to the switches illustrated as 454 through 478 on the panel 486, FIGURES 19 and 20. The heating supply tank T and heater 426 are enclosed in the cabinet 488, and the cooling unit TT is enclosed in cabinet 490, together with valves 400 and 406 and solenoids 430 and 432 housed in the housing 492, FIGURES 16 and 19.

The invention is not to be understood as restricted to the details set forth since these may be modified within the scope of the appended claims without departing from the spirit and scope of the invention.

Having thus described the invention, what is claimed as new and desired to be secured by Letters Patent is:

1. An apparatus for molding hollow articles comprising in combination:
   (a) a base,
   (b) an outer frame support having spaced side members and carried by said base,
   (c) first means carried by said base for rotating said outer frame support on an axis thereof on said base,
   (d) an inner frame support having spaced side members,
   (e) each of said side members and said inner frame pivotally connected to each of said side members of said outer frame,
   (f) second means carried by said outer frame for rotating said inner frame on an axis thereof within said outer frame with said rotational axis of said inner frame intersecting said rotational axis of said outer support,
   (g) a mold,
   (h) means for adjustably mounting said mold on said inner frame,
   (i) said mold having a plurality of elongated spaced conduit means extending externally upon said mold, and
   (j) means for supplying a liquid to and from said conduit means of said mold for heating and cooling the the same while said inner and outer supports are rotated.

2. The apparatus of claim 1 wherein:
   (a) said liquid supplying means includes a first rotary union connected to said outer frame,
   (b) a second rotary union connected to said inner frame,
   (c) a conduit connecting said first and second rotary unions,
   (d) a third rotary union connected to said inner frame,
   (e) said second rotary union coupled to said mold,
   (f) said third rotary union coupled to said mold, (g) a fourth rotary union connected to said outer frame,
(h) a conduit connecting said third rotary union and said fourth rotary union whereby a liquid may be supplied to and from said mold while the same is rotating.

3. The apparatus of claim 1 further including:
(a) means for varying the speed of rotation of said first support, and
(b) means for varying the speed of rotation of said second support.

4. The device of claim 1 in which:
(a) said conduit means upon said mold is divided into separate sections whereby portions of said mold may be heated and cooled independent of other portions, and
(b) said liquid supplying means includes means for selectively supplying liquid to said separate conduit sections.

5. An apparatus for molding hollow articles comprising in combination:
(a) a base,
(b) an outer frame support, having spaced side members and carried by said base,
(c) first means carried by said base for rotating said outer frame support on an axis thereof on said base,
(d) an inner frame support, having spaced side members
(e) each of said side members of said inner frame pivotally connected to each of said side members of said outer frame,
(f) second means carried by said outer frame for rotating said inner frame on an axis thereof within said outer frame with said rotational axis of said inner frame intersecting said rotational axis of said outer support,
(g) a mold,
(h) means for adjustably mounting said mold on said inner frame,
(i) said mold having a plurality of elongated spaced conduit means extending externally upon said mold,
(j) means for supplying a liquid to and from said conduit means of said mold for heating and cooling the same while said inner and outer supports are rotated, and
(k) means for actuating said liquid supplying means remotely from said conduit means.

6. An apparatus for molding hollow articles comprising in combination:
(a) a base,
(b) a first support,
(c) first means for rotating said first support on an axis thereof on said base,
(d) a second support,
(e) second means carried by said first support for rotating said second support on an axis thereof on said first support,
(f) a mold,
(g) means for adjustably mounting said mold on said second support,
(h) said mold having a plurality of spaced conduit means on said mold, and
(i) means for supplying a liquid to and from said conduit means of said mold for heating and cooling the mold while said inner and outer supports are rotated,
(j) said conduit means upon said mold being divided into separate sections whereby portions of said mold may be heated and cooled independent of other portions, and
(k) said liquid supplying means including means for selectively supplying liquid to said separate conduit sections.

References Cited

UNITED STATES PATENTS

| | | | |
|---|---|---|---|
| 1,812,242 | 6/1931 | Jensen. | |
| 2,317,597 | 4/1943 | Ford et al. | 18—38 |
| 2,451,992 | 10/1948 | Grotenhuis | 18—38 |
| 2,632,088 | 3/1953 | Meyrick et al. | 18—38 X |
| 2,886,851 | 5/1959 | Striekler et al. | 18—38 |
| 2,907,070 | 10/1959 | Van Hartesveldt | 18—38 |
| 3,041,671 | 7/1962 | Ericson | 18—26 |
| 3,123,865 | 3/1964 | Hawkinson | 18—38 |
| 3,217,078 | 11/1965 | Kleiber | 18—26 X |
| 3,275,733 | 9/1966 | Schule et al. | 18—26 X |
| 3,237,247 | 3/1966 | Eggert et al. | 18—26 |
| 2,886,851 | 5/1959 | Strickler et al. | 18—38 |
| 3,337,662 | 8/1967 | Spencer | 18—26 |

WILLIAM J. STEPHENSON, *Primary Examiner.*